US012777418B2

(12) United States Patent
Dutta et al.

(10) Patent No.: US 12,777,418 B2
(45) Date of Patent: Oct. 27, 2026

(54) ENHANCED USER EQUIPMENT (UE) TO NETWORK (U2N) RELAY OPERATION WITH LOW POWER WAKE UP SIGNAL (LP-WUS) SUPPORT

(71) Applicant: QUALCOMM Incorporated, San Diego, CA (US)

(72) Inventors: Sourjya Dutta, San Diego, CA (US); Navid Abedini, Basking Ridge, NJ (US); Kapil Gulati, Belle Mead, NJ (US)

(73) Assignee: QUALCOMM Incorproated, San Diego, CA (US)

( * ) Notice: Subject to any disclaimer, the term of this patent is extended or adjusted under 35 U.S.C. 154(b) by 247 days.

(21) Appl. No.: 18/795,063

(22) Filed: Aug. 5, 2024

(65) Prior Publication Data

US 2026/0040217 A1 Feb. 5, 2026

(51) Int. Cl.
*H04W 52/02* (2009.01)
*H04W 76/27* (2018.01)

(52) U.S. Cl.
CPC ....... *H04W 52/0229* (2013.01); *H04W 76/27* (2018.02)

(58) Field of Classification Search
CPC .......................... H04W 52/0229; H04W 76/27
See application file for complete search history.

(56) References Cited

U.S. PATENT DOCUMENTS

2016/0142974 A1* 5/2016 Lindoff ................ H04W 56/00 370/311
2017/0111147 A1* 4/2017 Cao .................... H04L 27/2613
2018/0324701 A1* 11/2018 Sun ....................... H04W 4/06
2019/0261178 A1* 8/2019 Rajadurai ........... H04W 12/069
2021/0227470 A1* 7/2021 Awoniyi-Oteri ...... H04W 76/28
2022/0046582 A1* 2/2022 Shrivastava ...... H04W 52/0229
2024/0112193 A1* 4/2024 Kim ......................... G06F 21/64
2024/0188038 A1* 6/2024 Martinez Tarradell ...................... H04W 76/27
2025/0317857 A1* 10/2025 Ljung .............. H04W 52/0216

* cited by examiner

*Primary Examiner* — Raymond S Dean
(74) *Attorney, Agent, or Firm* — Patterson + Sheridan, L.L.P.

(57) ABSTRACT

Certain aspects of the present disclosure provide a method for wireless communications at a relay node. The relay node may transmit capability information of the relay node to a gNode (gNB). The capability information may indicate a capability to receive one or more wakeup signals (WUSs) to exit from a low power state and a list of one or more user equipments (UEs) connected to the gNB via the relay node. The gNB may then send an indication to the relay node that the gNB supports transmission of the one or more WUSs to the relay node for a joint paging of the relay node and the one or more UEs.

20 Claims, 11 Drawing Sheets

ENHANCED USER EQUIPMENT (UE) TO NETWORK (U2N) RELAY OPERATION WITH LOW POWER WAKE UP SIGNAL (LP-WUS) SUPPORT

BACKGROUND

Field of the Disclosure

Aspects of the present disclosure relate to wireless communications, and more particularly, to techniques for managing paging of relay nodes and its associated user equipments (UEs).

Description of Related Art

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users.

Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and type of wireless communications mediums available for use, and the like. Consequently, there exists a need for further improvements in wireless communications systems to overcome the aforementioned technical challenges and others.

SUMMARY

One aspect provides a method for wireless communications at method for wireless communications at a relay node. The method includes transmitting, to a network entity, capability information of the relay node indicating a capability to receive one or more wakeup signals (WUSs) to exit from a low power state and a list of one or more user equipments (UEs) connected to the network entity via the relay node. The method further includes receiving an indication that the network entity supports transmission of the one or more WUSs to the relay node for a joint paging of the relay node and the one or more UEs.

Another aspect provides a method for wireless communications at a network entity. The method includes receiving from a relay node capability information of the relay node indicating a capability to receive one or more WUSs to exit from a low power state and a list of one or more UEs connected to the network entity via the relay node. The method further includes transmitting to the relay node an indication that the network entity supports transmission of the one or more WUSs to the relay node for a joint paging of the relay node and the one or more UEs.

Other aspects provide: an apparatus operable, configured, or otherwise adapted to perform the aforementioned methods as well as those described elsewhere herein; a non-transitory, computer-readable media comprising instructions that, when executed by a processor of an apparatus, cause the apparatus to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

DETAILED DESCRIPTION

Figure 1:
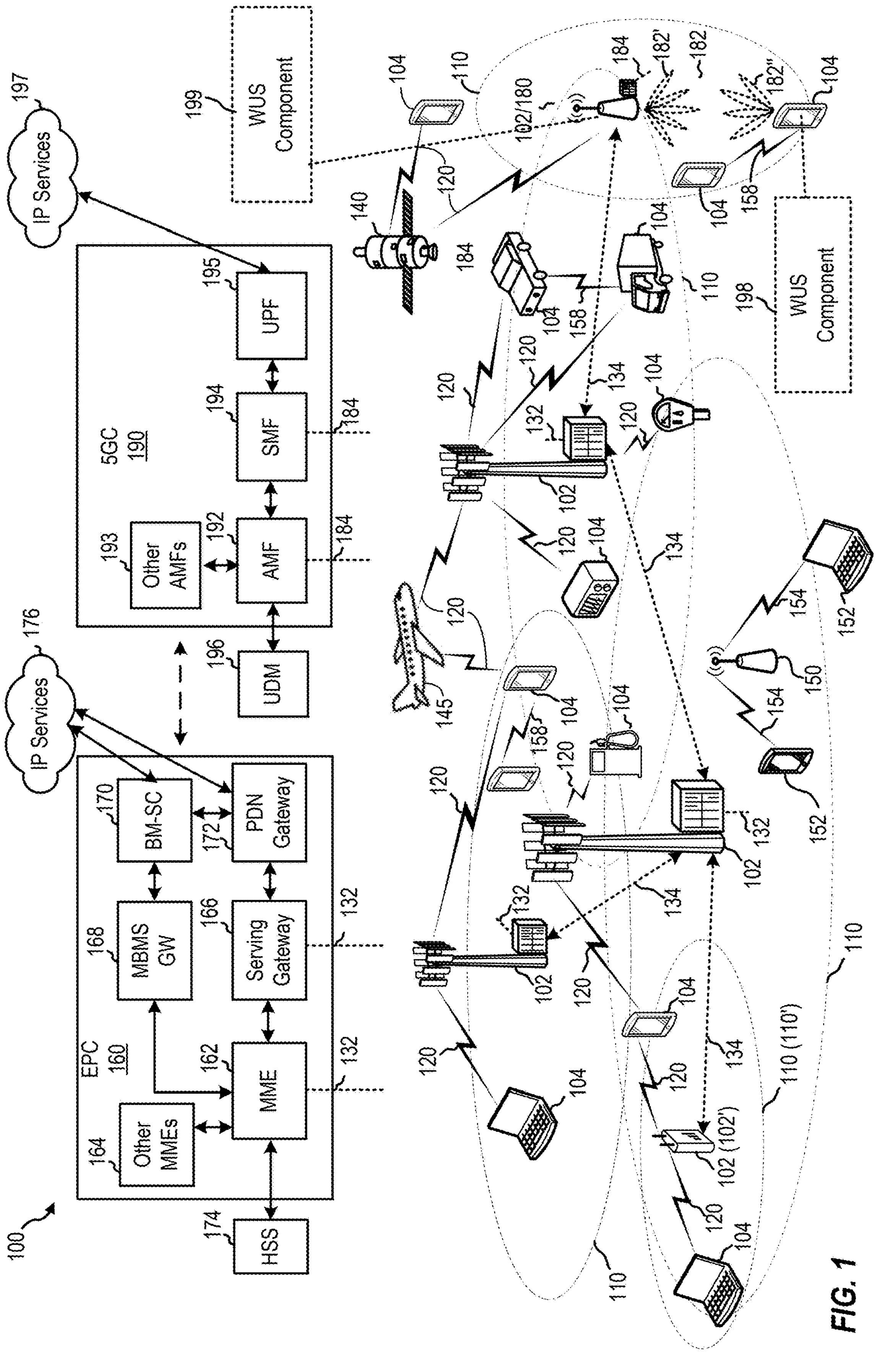
FIG. 1 depicts an example wireless communications network.

Aspects of the present disclosure relate to wireless communications, and more particularly, to techniques for managing paging of a relay node and its associated user equipments (UEs).

In wireless systems, a radio resource control (RRC) protocol may be used for various functions. For example, the functions of the RRC protocol may include connection establishment and release functions, broadcast of system information, radio bearer establishment, reconfiguration and release, RRC connection mobility procedures, paging notification and release and/or outer loop power control. The operation of the RRC may be guided by a state machine, which defines certain specific states (or modes) that a device such as a UE may be present in. The different RRC states may include an RRC connected state, an RRC inactive state, and/or an RRC idle state. Usually, when the UE is powered up, the UE may be in an RRC disconnected/idle state and may then move to the RRC connected state. If there is no activity from the UE for some time, the UE may suspend its RRC session by moving to the RRC inactive state and may later resume its RRC session by moving back to the RRC connected state.

In a normal operation, a UE must be awake all the time in order to decode downlink data from a gNodeB (gNB), as the data in a downlink may arrive at any time. This means that the UE must be monitoring a physical downlink control channel (PDCCH) from the gNB in every subframe in order to check if there is the PDCCH available. This consumes a lot of battery power of the UE. A connected-mode discontinuous reception (CDRX) mode may enable the UE to turn off one or more components, such as a receiver, during certain periods because the UE is not anticipating receiving any downlink communications. For example, the CDRX mode may improve battery power consumption of the UE by allowing the UE to periodically enter a sleep state (e.g., Off duration) during which the PDCCH need not be monitored. In order to monitor the PDCCH for possible data, the UE may be allowed to wake up periodically and stay awake (e.g., On duration) for a certain amount of time before going to the sleep again.

A wake up signal (WUS) is a power saving mechanism that may be used to save power by letting a UE to continue to sleep (i.e., no wake up) even for the On duration period when there is no data for the UE. For instance, the WUS may let the UE know if a transmission is pending or allowing the UE to stay in a low-power mode (e.g., and skip a next low-power DRX monitoring period). When there is any data for the UE, the gNB may notify the UE to wake up using the WUS, so that the UE wakes up and receives data during the On duration period.

A UE to network (e.g., gNB) relay node may be used to extend or improve the coverage of a gNB. For instance, multiple UEs may connect to the gNB via the relay node. The relay node and the UEs may or may not support receiving the WUS to exit from their sleep state. For example, in one scenario, the relay node may support receiving the WUS to exit from the sleep state while some of the UEs may not support receiving the WUS to exit from the sleep state. In another scenario, the relay node may not support receiving the WUS to exit from the sleep state while some of the UEs may support receiving the WUS to exit from the sleep state. Since the gNB may not be aware of different capabilities (e.g., related to receiving the WUS) of the UEs and the relay node, there is a need for the relay node to determine and share the different capabilities of the UEs and the relay node with the gNB, in order for the gNB to enhance a paging procedure for the UEs and the relay node by incorporating the different capabilities of the UEs and the relay node.

Techniques proposed herein may allow a relay node to share with a gNB a list of UEs connected to the gNB via the relay node and that the relay node (and some of the UEs) may expect to be woken up by a WUS from the gNB. The relay node may receive an indication from the gNB indicating the gNB support for using the WUS for a joint paging of the relay node and its associated UEs, which may optimize power savings of the relay node and its associated UEs. The joint paging of the relay node and its associated UEs by the gNB may save resources of the gNB.

Introduction to Wireless Communications Networks

The techniques and methods described herein may be used for various wireless communications networks. While aspects may be described herein using terminology commonly associated with 3G, 4G, and/or 5G wireless technologies, aspects of the present disclosure may likewise be applicable to other communications systems and standards not explicitly mentioned herein.

FIG. 1 depicts an example of a wireless communications network 100, in which aspects described herein may be implemented.

Generally, wireless communications network 100 includes various network entities (alternatively, network elements or network nodes). A network entity is generally a communications device and/or a communications function performed by a communications device (e.g., a user equipment (UE), a base station (BS), a component of a BS, a server, etc.). For example, various functions of a network as well as various devices associated with and interacting with a network may be considered network entities. Further, wireless communications network 100 includes terrestrial aspects, such as ground-based network entities (e.g., BSs 102), and non-terrestrial aspects, such as satellite 140 and aircraft 145, which may include network entities on-board (e.g., one or more BSs) capable of communicating with other network elements (e.g., terrestrial BSs) and UEs.

In the depicted example, wireless communications network 100 includes BSs 102, UEs 104, and one or more core networks, such as an Evolved Packet Core (EPC) 160 and 5G Core (5GC) network 190, which interoperate to provide communications services over various communications links, including wired and wireless links.

FIG. 1 depicts various example UEs 104, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, or other similar devices. UEs 104 may also be referred to more generally as a mobile device, a wireless device, a wireless communications device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

BSs 102 wirelessly communicate with (e.g., transmit signals to or receive signals from) UEs 104 via communications links 120. The communications links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communications links 120 may use multiple-input and multiple-output (MIMO) antenna technology, including spatial multiplexing, beamforming, and/or transmit diversity in various aspects.

BSs 102 may generally include: a NodeB, enhanced NodeB (CNB), next generation enhanced NodeB (ng-eNB), next generation NodeB (gNB or gNodeB), access point, base transceiver station, radio BS, radio transceiver, transceiver function, transmission reception point, and/or others. Each of BSs 102 may provide communications coverage for a respective geographic coverage area 110, which may sometimes be referred to as a cell, and which may overlap in some cases (e.g., small cell 102' may have a coverage area 110' that overlaps the coverage area 110 of a macro cell). A BS may, for example, provide communications coverage for a macro cell (covering relatively large geographic area), a pico cell (covering relatively smaller geographic area, such as a sports stadium), a femto cell (relatively smaller geographic area (e.g., a home)), and/or other types of cells.

Figure 2:
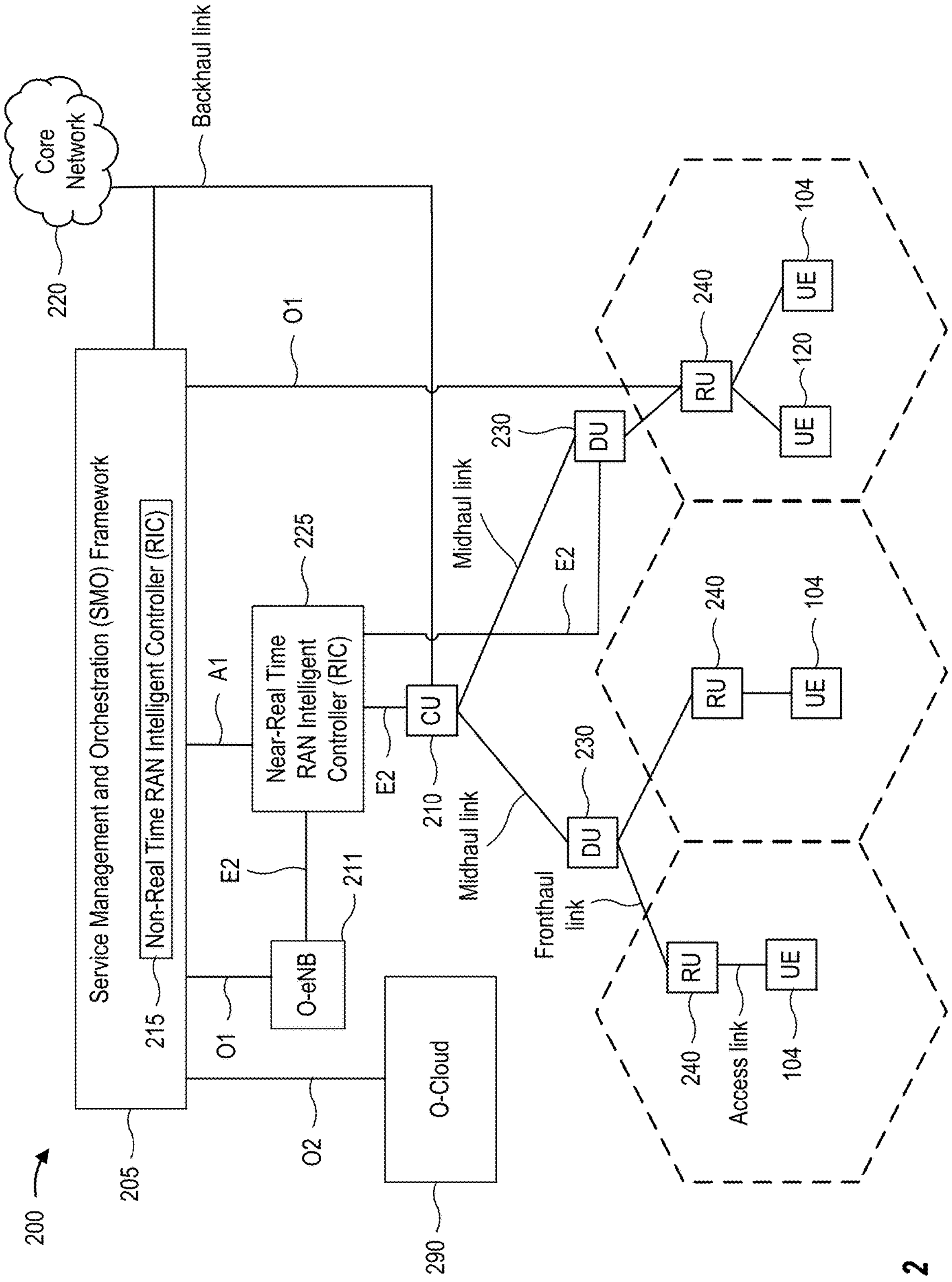
FIG. 2 depicts an example disaggregated base station (BS) architecture.

While BSs 102 are depicted in various aspects as unitary communications devices, BSs 102 may be implemented in various configurations. For example, one or more components of a BS 102 may be disaggregated, including a central unit (CU), one or more distributed units (DUs), one or more radio units (RUs), a Near-Real Time (Near-RT) RAN Intelligent Controller (RIC), or a Non-Real Time (Non-RT) RIC, to name a few examples. In another example, various aspects of a BS 102 may be virtualized. More generally, a BS (e.g., BS 102) may include components that are located at a single physical location or components located at various physical locations. In examples in which a BS 102 includes components that are located at various physical locations, the various components may each perform functions such that, collectively, the various components achieve functionality that is similar to a BS 102 that is located at a single physical location. In some aspects, a BS 102 including components that are located at various physical locations may be referred to as a disaggregated radio access network (RAN) architecture, such as an Open RAN (O-RAN) or Virtualized RAN (VRAN) architecture. FIG. 2 depicts and describes an example disaggregated BS architecture.

Different BSs 102 within wireless communications network 100 may also be configured to support different radio access technologies, such as 3G, 4G, and/or 5G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface), which may be wired or wireless.

Wireless communications network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 600 MHZ-6 GHz, which is often referred to (interchangeably) as "Sub-6 GHz". Similarly, 3GPP currently defines Frequency Range 2 (FR2) as including 26-41 GHz, which is sometimes referred to (interchangeably) as a "millimeter wave" ("mmW" or "mm Wave"). A BS configured to communicate using mm Wave/near mm Wave radio frequency bands (e.g., a mmWave BS such as BS 180) may utilize beamforming (e.g., 182) with a UE (e.g., 104) to improve path loss and range.

The communications links 120 between BSs 102 and, for example, UEs 104, may be through one or more carriers, which may have different bandwidths (e.g., 5, 10, 15, 20, 100, 400, and/or other MHz), and which may be aggregated in various aspects. Carriers may or may not be adjacent to each other. Allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain BSs (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming. In some cases, BS 180 may transmit a beamformed signal to UE 104 in one or more transmit directions 182'. UE 104 may receive the beamformed signal from the BS 180 in one or more receive directions 182". UE 104 may also transmit a beamformed signal to the BS 180 in one or more transmit directions 182". BS 180 may also receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Wireless communications network 100 further includes a Wi-Fi AP 150 in communication with Wi-Fi stations (STAs) 152 via communications links 154 in, for example, a 2.4 GHz and/or 5 GHz unlicensed frequency spectrum.

Certain UEs 104 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and/or a Packet Data Network (PDN) Gateway 172, such as in the depicted example. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and/or may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and/or may be responsible for session management (start/stop) and for collecting eMBMS related charging information.

5GC 190 may include various functional components, including: an Access and Mobility Management Function (AMF) 192, other AMFs 193, a Session Management Function (SMF) 194, and a User Plane Function (UPF) 195. AMF 192 may be in communication with Unified Data Management (UDM) 196.

AMF 192 is a control node that processes signaling between UEs 104 and 5GC 190. AMF 192 provides, for example, quality of service (QOS) flow and session management.

Internet protocol (IP) packets are transferred through UPF 195, which is connected to the IP Services 197, and which provides UE IP address allocation as well as other functions for 5GC 190. IP Services 197 may include, for example, the Internet, an intranet, an IMS, a PS streaming service, and/or other IP services.

Figure 10:
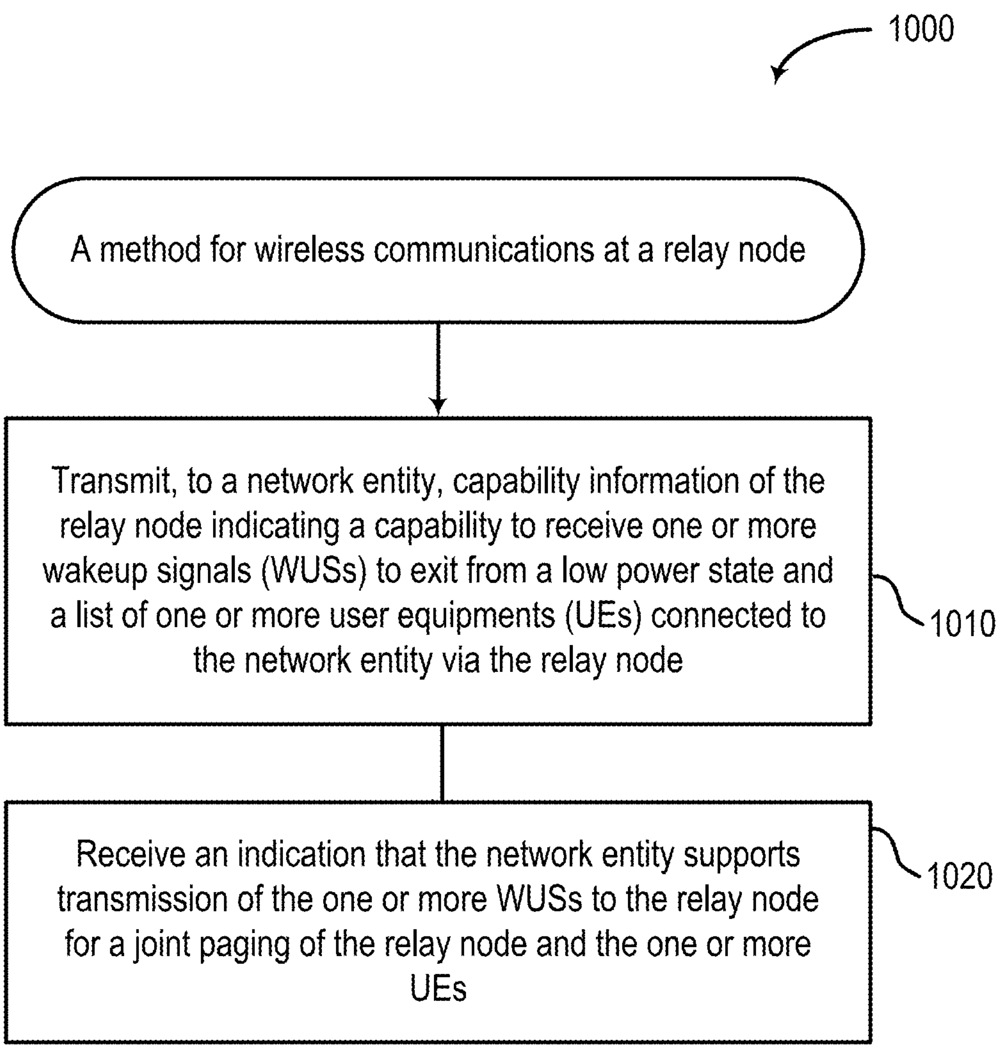
FIG. 10 depicts example methods for wireless communications at a relay node for managing joint paging of a relay node and its associated UEs.

Wireless communication network 100 further includes wake up signal (WUS) component 198, which may be configured to perform method 1000 of FIG. 10. Wireless communication network 100 further includes WUS component 199, which may be configured to perform method 1000 of FIG. 10.

In various aspects, a network entity or network node can be implemented as an aggregated BS, as a disaggregated BS, a component of a BS, an integrated access and backhaul (IAB) node, a relay node, a sidelink node, to name a few examples.

FIG. 2 depicts an example disaggregated BS 200 architecture. The disaggregated BS 200 architecture may include one or more central units (CUs) 210 that can communicate directly with a core network 220 via a backhaul link, or indirectly with the core network 220 through one or more disaggregated BS units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUS 210, the DUs 230, the RUs 240, as well as the Near-RT RICs 225, the Non-RT RICs 215 and the SMO Framework 245, may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (e.g., Central Unit—User Plane (CU-UP)), control plane functionality (e.g., Central Unit—Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more BS functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (IFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communications with one or more UEs 104. In some implementations, real-time and non-real-time aspects of control and user plane communications with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUS 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

Figure 3:
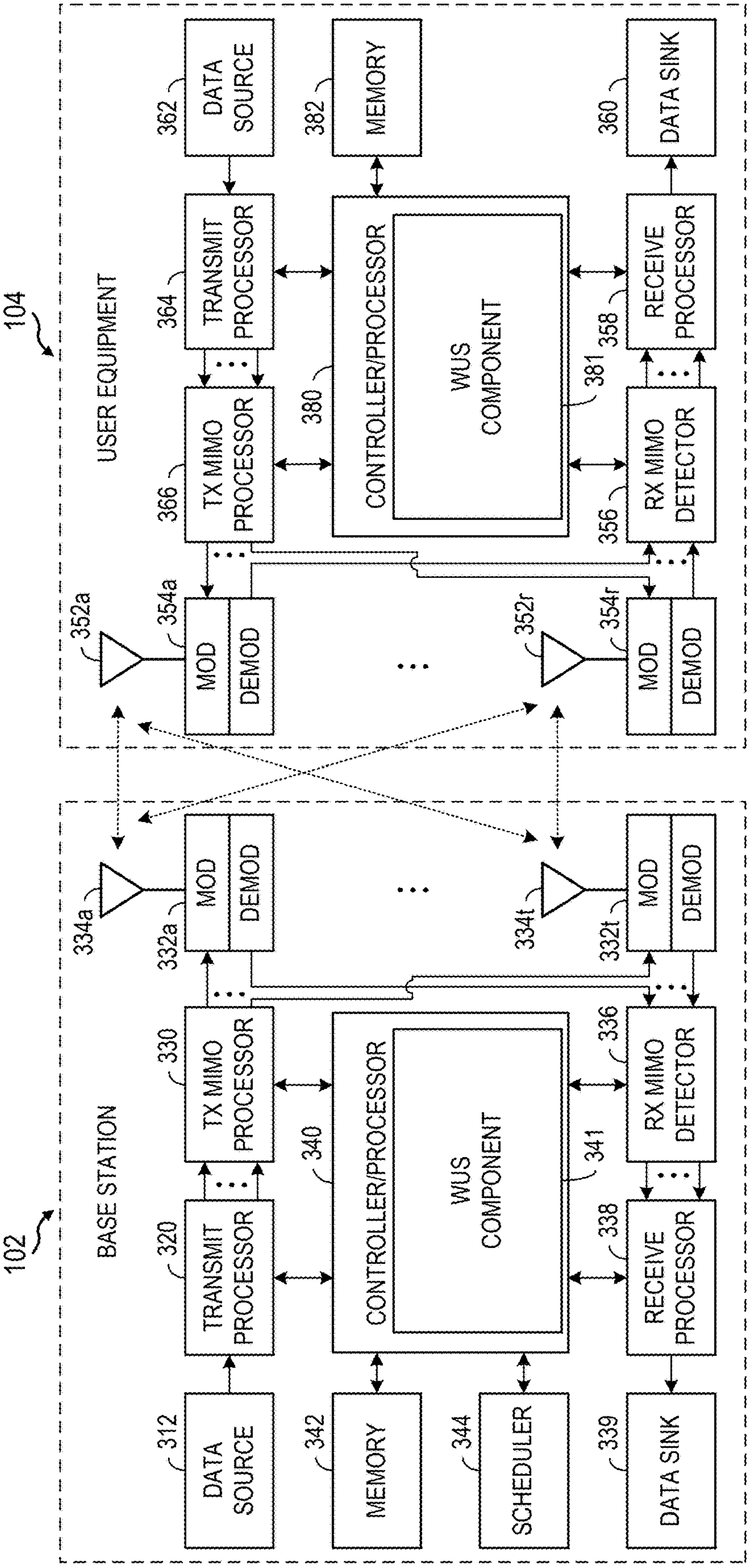
FIG. 3 depicts aspects of an example BS and an example user equipment (UE).

FIG. 3 depicts aspects of an example BS 102 and a UE 104.

Generally, BS 102 includes various processors (e.g., 324, 330, 338, and 340), antennas 334*a-t* (collectively 334), transceivers 332*a-t* (collectively 332), which include modulators and demodulators, and other aspects, which enable wireless transmission of data (e.g., data source 312) and wireless reception of data (e.g., data sink 339). For example, BS 102 may send and receive data between BS 102 and UE 104. BS 102 includes controller/processor 340, which may be configured to implement various functions described herein related to wireless communications.

BS 102 includes controller/processor 340, which may be configured to implement various functions related to wireless communications. In the depicted example, controller/processor 340 includes WUS component 341, which may be representative of WUS component 199 of FIG. 1. Notably, while depicted as an aspect of controller/processor 340, WUS component 341 may be implemented additionally or alternatively in various other aspects of BS 102 in other implementations.

Generally, UE 104 includes various processors (e.g., 358, 364, 366, and 380), antennas 352*a-r* (collectively 352), transceivers 354*a-r* (collectively 354), which include modulators and demodulators, and other aspects, which enable wireless transmission of data (e.g., retrieved from data source 362) and wireless reception of data (e.g., provided to data sink 360). UE 104 includes controller/processor 380, which may be configured to implement various functions described herein related to wireless communications.

UE 104 includes controller/processor 380, which may be configured to implement various functions related to wireless communications. In the depicted example, controller/processor 380 includes WUS component 381, which may be representative of WUS component 138 of FIG. 1. Notably, while depicted as an aspect of controller/processor 380, WUS component 381 may be implemented additionally or alternatively in various other aspects of UE 104 in other implementations.

In regards to an example downlink transmission, BS 102 includes a transmit processor 320 that may receive data from a data source 312 and control information from a controller/processor 340. The control information may be for the physical broadcast channel (PBCH), physical control format indicator channel (PCFICH), physical HARQ indicator channel (PHICH), physical downlink control channel (PDCCH), group common PDCCH (GC PDCCH), and/or others. The data may be for the physical downlink shared channel (PDSCH), in some examples.

Transmit processor 320 may process (e.g., encode and symbol map) the data and control information to obtain data symbols and control symbols, respectively. Transmit processor 320 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332*a*-332*t*. Each modulator in transceivers 332*a*-332*t* may process a respective output symbol stream to obtain an output sample stream. Each modulator may further process (e.g., convert to analog, amplify, filter, and upconvert) the output sample stream to obtain a downlink signal. Downlink signals from the modulators in transceivers 332*a*-332*t* may be transmitted via the antennas 334*a*-334*t*, respectively.

In order to receive the downlink transmission, UE 104 includes antennas 352*a*-352*r* that may receive the downlink signals from the BS 102 and may provide received signals to the demodulators (DEMODs) in transceivers 354*a*-354*r*, respectively. Each demodulator in transceivers 354*a*-354*r* may condition (e.g., filter, amplify, downconvert, and digitize) a respective received signal to obtain input samples. Each demodulator may further process the input samples to obtain received symbols.

MIMO detector 356 may obtain received symbols from all the demodulators in transceivers 354*a*-354*r*, perform MIMO detection on the received symbols if applicable, and provide detected symbols. Receive processor 358 may process (e.g., demodulate, deinterleave, and decode) the detected symbols, provide decoded data for the UE 104 to a data sink 360, and provide decoded control information to a controller/processor 380.

In regards to an example uplink transmission, UE 104 further includes a transmit processor 364 that may receive and process data (e.g., for the PUSCH) from a data source 362 and control information (e.g., for the physical uplink control channel (PUCCH)) from the controller/processor 380. Transmit processor 364 may also generate reference symbols for a reference signal (e.g., for the SRS). The symbols from the transmit processor 364 may be precoded by a TX MIMO processor 366 if applicable, further processed by the modulators in transceivers 354*a*-354*r* (e.g., for SC-FDM), and transmitted to BS 102.

At BS 102, the uplink signals from UE 104 may be received by antennas 334*a-t*, processed by the demodulators in transceivers 332*a*-332*t*, detected by a MIMO detector 336 if applicable, and further processed by a receive processor 338 to obtain decoded data and control information sent by UE 104. Receive processor 338 may provide the decoded data to a data sink 339 and the decoded control information to the controller/processor 340.

Memories 342 and 382 may store data and program codes for BS 102 and UE 104, respectively.

Scheduler 344 may schedule UEs 104 for data transmission on the downlink and/or uplink.

In various aspects, BS 102 may be described as transmitting and receiving various types of data associated with the methods described herein. In these contexts, "transmitting" may refer to various mechanisms of providing or outputting data, such as outputting data from data source 312, scheduler 344, memory 342, transmit processor 320, controller/processor 340, TX MIMO processor 330, transceivers 332*a-t*, antenna 334*a-t*, and/or other aspects described herein. Similarly, "receiving" may refer to various mechanisms of obtaining data, such as obtaining data from antennas 334*a-t*, transceivers 332*a-t*, RX MIMO detector 336, controller/processor 340, receive processor 338, scheduler 344, memory 342, and/or other aspects described herein.

In various aspects, UE 104 may likewise be described as transmitting and receiving various types of data associated with the methods described herein. In these contexts, "transmitting" may refer to various mechanisms of outputting data, such as outputting data from data source 362, memory 382, transmit processor 364, controller/processor 380, TX MIMO processor 366, transceivers 354*a-t*, antenna 352*a-t*, and/or other aspects described herein. Similarly, "receiving" may refer to various mechanisms of obtaining data, such as obtaining data from antennas 352*a-t*, transceivers 354*a-t*, RX MIMO detector 356, controller/processor 380, receive processor 358, memory 382, and/or other aspects described herein.

In some aspects, a processor may be configured to perform various operations, such as those associated with the methods described herein, and transmit (output) to or receive (obtain) data from another interface that is configured to transmit or receive, respectively, the data.

FIG. 4A, FIG. 4B, FIG. 4C, and FIG. 4D depict aspects of data structures for a wireless communications network, such as wireless communications network 100 of FIG. 1.

Figure 4B:
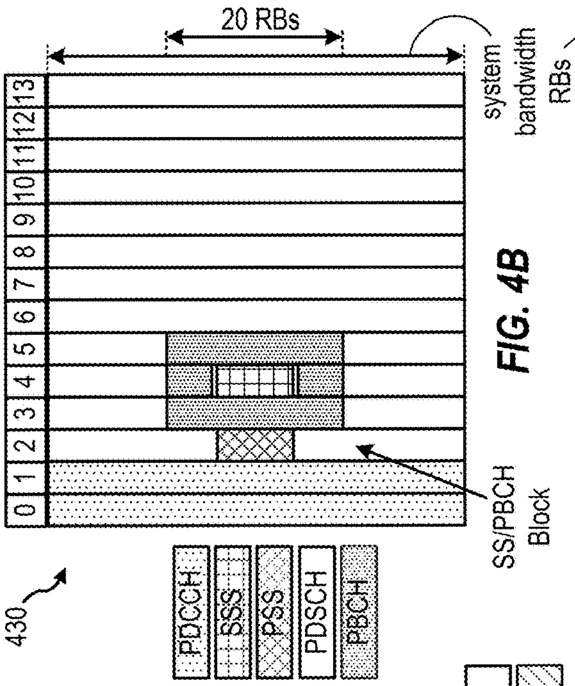
FIG. 4A, FIG. 4B, FIG. 4C, and FIG. 4D depict various example aspects of data structures for a wireless communications network.
Figure 4D:
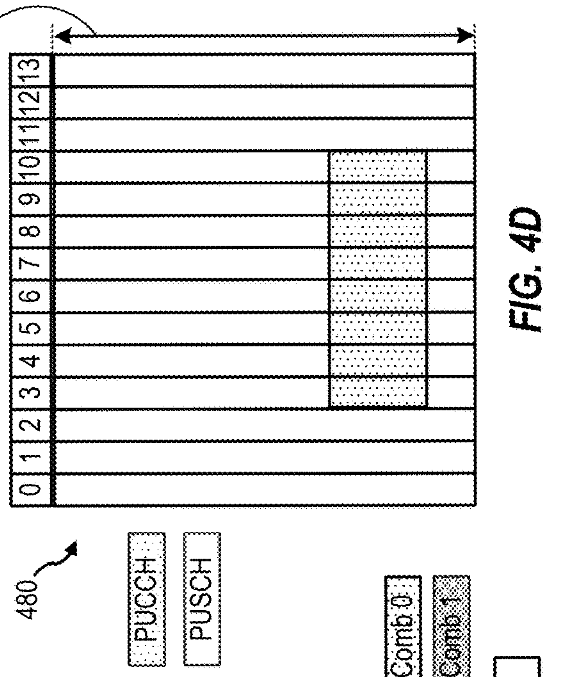
Figure 4A:
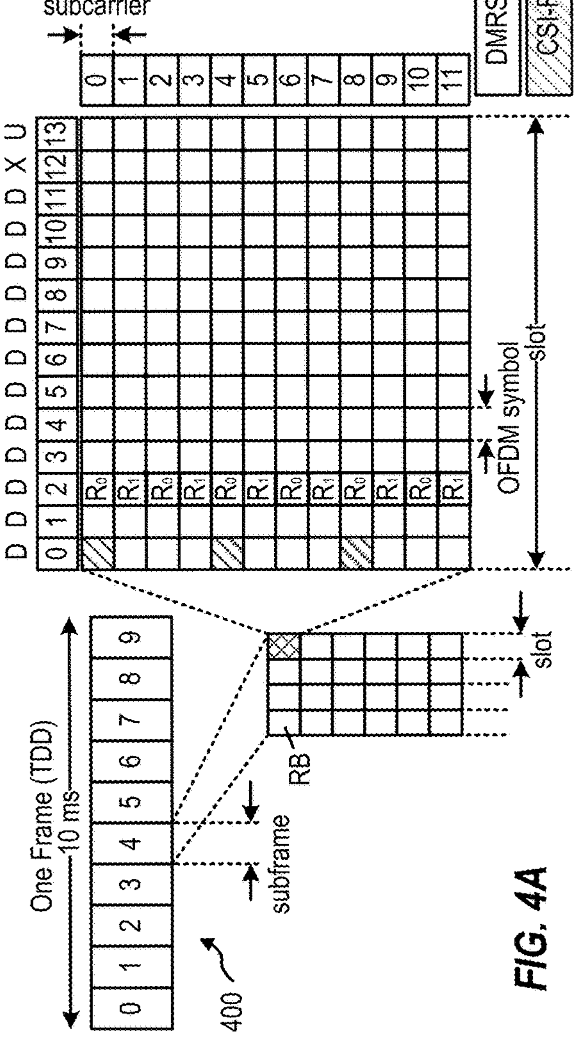
Figure 4C:
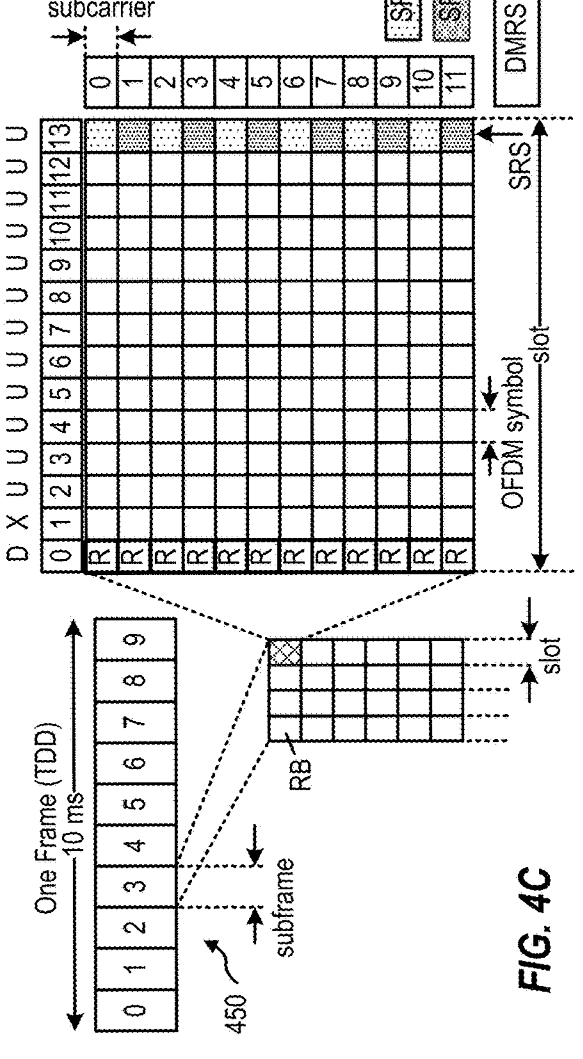

In particular, FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIG. 4B and FIG. 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of subcarriers are dedicated for either DL or UL. Wireless communications frame structures may also be TDD, in which, for a particular set of subcarriers, subframes within the set of subcarriers are dedicated for both DL and UL.

In FIGS. 4A and 4C, the wireless communications frame structure is TDD where D is DL, U is UL, and X is flexible for use between DL/UL. UEs 104 may be configured with a slot format through a received slot format indicator (SFI) (dynamically through DL control information (DCI), or semi-statically/statically through radio resource control (RRC) signaling). In the depicted examples, a 10 ms frame is divided into 10 equally sized 1 ms subframes. Each subframe may include one or more time slots. In some examples, each slot may include 7 or 14 symbols, depending on the slot format. Subframes may also include mini-slots, which generally have fewer symbols than an entire slot. Other wireless communications technologies may have a different frame structure and/or different channels.

In certain aspects, the number of slots within a subframe is based on a slot configuration and a numerology. For example, for slot configuration 0, different numerologies (μ) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and 2 μ slots/subframe. The subcarrier spacing and symbol length/duration are a function of the numerology. The subcarrier spacing may be equal to $2^{u}\times 15$ kHz, where u is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIG. 4A, FIG. 4B, FIG. 4C, and FIG. 4D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

As depicted in FIG. 4A, FIG. 4B, FIG. 4C, and FIG. 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme.

As illustrated in FIG. 4A, some of the REs carry reference (pilot) signals (RS) for a UE (e.g., UE 104 of FIG. 1 and FIG. 3). The RS may include demodulation RS (DMRS) and/or channel state information reference signals (CSI-RS) for channel estimation at the UE. The RS may also include beam measurement RS (BRS), beam refinement RS (BRRS), and/or phase tracking RS (PT-RS).

FIG. 4B illustrates an example of various DL channels within a subframe of a frame. The physical downlink control channel (PDCCH) carries DCI within one or more control channel elements (CCEs), each CCE including, for example, nine RE groups (REGs), each REG including, for example, four consecutive REs in an OFDM symbol.

A primary synchronization signal (PSS) may be within symbol 2 of particular subframes of a frame. The PSS is used by a UE (e.g., 104 of FIG. 1 and FIG. 3) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and/or paging messages.

As illustrated in FIG. 4C, some of the REs carry DMRS (indicated as R for one particular configuration, but other DMRS configurations are possible) for channel estimation at the BS. The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may transmit sounding reference signals (SRS). The SRS may be transmitted, for example, in the last symbol of a subframe. The SRS may have a comb structure, and a UE may transmit SRS on one of the combs. The SRS may be used by a BS for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Introduction to mm Wave Wireless Communications

In wireless communications, an electromagnetic spectrum is often subdivided into various classes, bands, channels, or other features. The subdivision is often provided based on wavelength and frequency, where frequency may also be referred to as a carrier, a subcarrier, a frequency channel, a tone, or a subband.

$5^{th}$ generation (5G) networks may utilize several frequency ranges, which in some cases are defined by a standard, such as $3^{rd}$ generation partnership project (3GPP) standards. For example, 3GPP technical standard TS 38.101 currently defines Frequency Range 1 (FR1) as including 600 MHz-6 GHz, though specific uplink and downlink allocations may fall outside of this general range. Thus, FR1 is often referred to (interchangeably) as a “Sub-6 GHz” band.

Similarly, TS 38.101 currently defines Frequency Range 2 (FR2) as including 26-41 GHz, though again specific uplink and downlink allocations may fall outside of this general range. FR2, is sometimes referred to (interchangeably) as a “millimeter wave” (“mmW” or “mmWave”) band, despite being different from the extremely high frequency (EHF) band (30 GHz-300 GHz) that is identified by the International Telecommunications Union (ITU) as a “millimeter wave” band because wavelengths at these frequencies are between 1 millimeter and 10 millimeters.

Communications using mm Wave/near mm Wave radio frequency band (e.g., 3 GHz-300 GHz) may have higher path loss and a shorter range compared to lower frequency communications. As described above with respect to FIG. 1, a base station (BS) (e.g., 180) configured to communicate using mmWave/near mmWave radio frequency bands may utilize beamforming (e.g., 182) with a user equipment (UE) (e.g., 104) to improve path loss and range.

Overview of Sidelink Systems

User equipments (UEs) communicate with each other using sidelink signals. Real-world applications of sidelink communications may include UE-to-network relaying, vehicle-to-vehicle (V2V) communications, vehicle-to-everything (V2X) communications, Internet of Everything (IoE) communications, IoT communications, mission-critical mesh, and/or various other suitable applications.

A sidelink signal refers to a signal communicated from one UE to another UE without relaying that communication through a scheduling entity (e.g., a UE or a network entity), even though the scheduling entity may be utilized for scheduling and/or control purposes. In some cases, the sidelink signal is communicated using a licensed spectrum (e.g., unlike wireless local area networks, which use an unlicensed spectrum). One example of sidelink communication is PC5, for example, as used in V2V, long term evolution (LTE), and/or new radio (NR).

Various sidelink channels are used for sidelink communications, including a physical sidelink discovery channel (PSDCH), a physical sidelink control channel (PSCCH), a physical sidelink shared channel (PSSCH), and a physical sidelink feedback channel (PSFCH). The PSDCH carries discovery expressions that enable proximal UEs to discover each other. The PSCCH carries control signaling such as sidelink resource configurations, resource reservations, and other parameters used for data transmissions. The PSSCH carries data transmissions. The PSFCH carries a feedback such as acknowledgement (ACK) and/or negative ACK (NACK) information corresponding to transmissions on the PSSCH.

In some NR systems, a two stage sidelink control information (SCI) is supported. The two stage SCI includes a first stage SCI (e.g., SCI-1) and a second stage SCI (e.g., SCI-2). The SCI-1 includes resource reservation and allocation information. The SCI-2 includes information that can be used to decode data and to determine whether a UE is an intended recipient of a transmission. The SCI-1 and/or the SCI-2 may be transmitted over the PSCCH.

Figure 5:
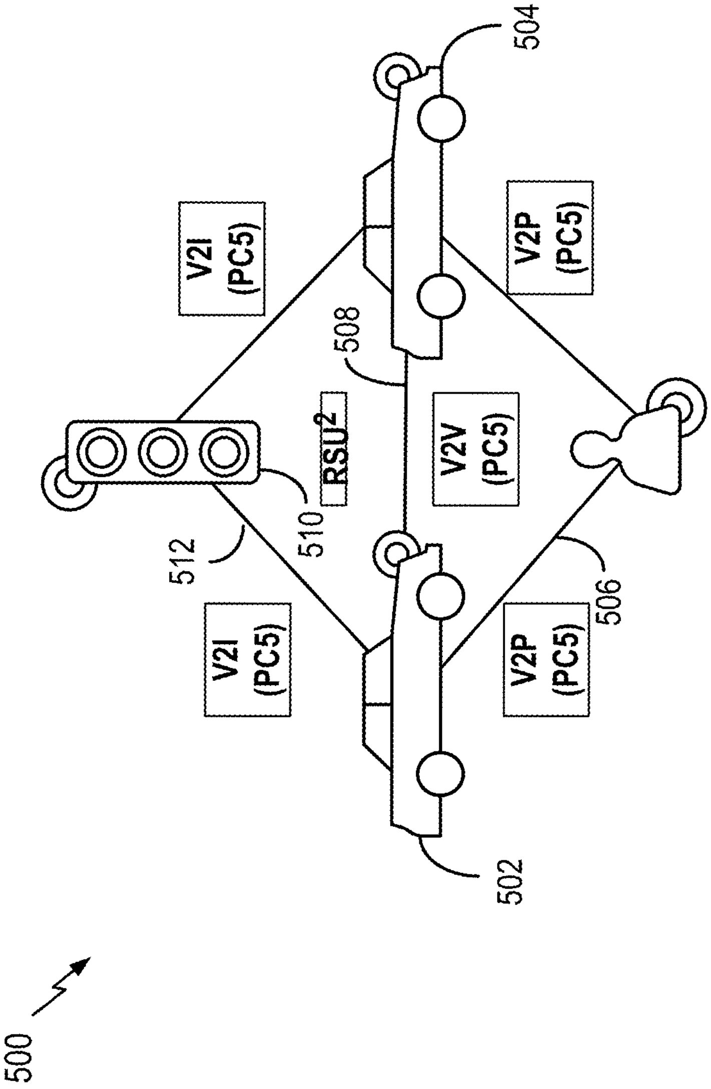
FIGS. 5 and 6 depict diagrammatic representations of example vehicle-to-everything (V2X) systems.
Figure 6:
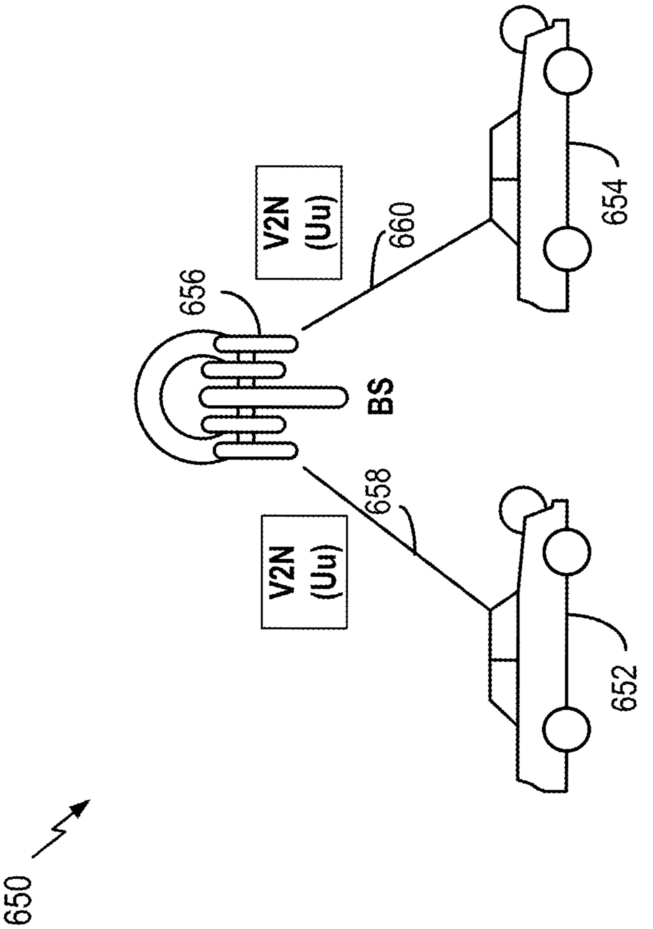

FIG. 5 and FIG. 6 show diagrammatic representations of example V2X systems. For example, vehicles shown in FIG. 5 and FIG. 6 communicate via sidelink channels and relay sidelink transmissions. V2X is a vehicular technology system that enables vehicles to communicate with traffic and an environment around them using short-range wireless signals, known as sidelink transmissions or signals.

The V2X systems shown in FIG. 5 and FIG. 6 provide two complementary transmission modes. A first transmission mode, shown by way of example in FIG. 5, involves direct communications (e.g., also referred to as sidelink communications) between participants in proximity to one another in a local area. A second transmission mode, shown by way of example in FIG. 6, involves network communications through a network entity, which may be implemented over a Uu interface (for example, a wireless communication interface between a radio access network (RAN) and a UE).

Referring to FIG. 5, a V2X system 500 (e.g., including V2V communications) is illustrated with two vehicles 502, 504. A first transmission mode allows for direct communication between different participants in a given geographic location. As illustrated, a vehicle 502 can have a wireless communication link 506 with an individual through a PC5 interface. Communications between the vehicles 502 and 504 may also occur through a PC5 interface 508. The communication may occur from the vehicle 502 to other highway components (e.g., a roadside unit (RSU) 510), such as a traffic signal or sign through a PC5 interface 512. With respect to each communication link illustrated in FIG. 5, two-way communication may take place between devices (such as the vehicles 502 and 504, the RSU 510), and therefore each device may be a transmitter and/or a receiver of information. The V2X system 500 is a self-managed system implemented without assistance from a network entity. The self-managed system may enable improved spectral efficiency, reduced cost, and increased reliability as network service interruptions do not occur during handover operations for moving the vehicles 502 and 504. The V2X system 500 is configured to operate in a licensed or unlicensed spectrum, and thus any of the vehicles 502 and 504 with an equipped system may access a common frequency and share information. Such harmonized/common spectrum operations allow for safe and reliable operation.

FIG. 6 shows a V2X system 650 for communication between a vehicle 652 and a vehicle 654 through a network entity 656 (e.g., a base station (BS)). Network communications may occur through discrete nodes, such as the network entity 656 that sends and receives information to and from (e.g., relays information between) the vehicles 652, 654. The network communications through vehicle to network (V2N) links 658 and 660 may be used, for example, for long-range communications between the vehicles 652, 654, such as for communicating the presence of a vehicle accident at a distance ahead along a road or highway. Other types of communications may be sent by a wireless node to the vehicles 652, 654, such as traffic flow conditions, road hazard warnings, environmental/weather reports, and service station availability, among other examples. Such data can be obtained from cloud-based sharing services.

Overview of Discontinuous Reception (DRX) Operations

Discontinuous reception (DRX) is a power-saving mechanism used in communication systems to extend a battery life of a wireless node such as a user equipment (UE). The DRX mechanism may be used by UEs to periodically turn off their receivers and enter a low-power state, waking up only at specific intervals to check for incoming data or signals. This helps in reducing power consumption during periods of inactivity.

A DRX cycle defines a duration for which the UE remains in an active state before entering a low-power state. The DRX cycle may be divided into on-duration (active state) and off-duration (low-power state).

A long DRX cycle may refer to a DRX configuration with a longer cycle duration, which is suitable for scenarios where the UE can afford to stay in a low-power state for extended periods. A short DRX cycle may refer to a DRX configuration with a shorter cycle duration, suitable for scenarios where the UE needs to be more responsive and cannot afford long periods of inactivity.

In connected mode, where the UE is actively communicating with a network entity, connected-mode discontinuous reception (CDRX) allows the UE to periodically switch between active and low-power states. This is particularly useful when the UE expects incoming data but wants to conserve power during idle periods.

In CDRX, when there is no data transmission in either direction (uplink (UL)/downlink (DL)) for a UE in a radio resource control (RRC) connected mode, the UE goes into a DRX mode. In CDRX, the UE monitors a physical downlink control channel (PDCCH) channel discontinuously. In other words, the UE alternates between sleep (DRX OFF) cycles and wake (DRX ON) cycles. CDRX results in power savings because, without the DRX cycles, the UE would needlessly monitor for PDCCH transmissions in every subframe to check if there is downlink data available.

The UE may be configured for CDRX according to various configuration parameters, such as an inactivity timer, a short DRX timer, a short DRX cycle, and a long DRX cycle.

In some cases, sleep (OFF) durations may be extended using wake-up signals (WUS). For example, before CDRX ON duration, only a wake-up subsystem is turned on for WUS decoding (e.g., while a main modem of a UE is not powered on). The wake-up subsystem is a low complexity receiver (e.g., a simple correlator) using a lower power than PDCCH decoding. The WUS may be a special waveform, such as special tone, preamble, reference-signal, or the like. In such cases, only when the WUS is detected by the UE, the UE wakes-up a full modem for the next CDRX ON duration. Otherwise, the UE skips the CDRX ON duration and goes back to the sleep until a next CDRX cycle.

Overview of Paging in New Radio (NR)

Paging configuration and monitoring for NR inherited features from the LTE paging channel design, with various elements. For example, NR uses the concept of a user equipment (UE) periodicity (T) for monitoring paging. UE derives its value for T based on a cell's default paging cycle, its own UE-specific discontinuous reception (DRX) cycle or extended DRX (eDRX) configuration. Typical values of T are 640 ms, 1280 ms, 2560 ms, and 5120 ms. T is also referred to herein as the paging cycle.

NR also utilizes the concept of a Paging Frame (PF), which generally refers to a radio frame that contains one or more paging occasions (PO). A PO generally refers to a set of time and frequency resources during which a UE monitors for paging messages. The network typically configures a number of PFs per paging cycle, as well as a start offset for the start location of a PF within one paging cycle. Based on the configuration, a radio frame may be considered a PF if it satisfies the following equation:

$$(\mathrm{SFN}+\mathrm{PF\_offset}) \bmod T=(T \operatorname{div} N)*(\mathrm{UE\_ID} \bmod N);$$

where SFN is the system frame number of the radio frame, PF_offset is the start offset for the PF, and UE_ID is the UE's ID, for example a Temporary Mobile Subscriber Identity (TMSI) assigned by a core network (CN). Within a PF, there may be one or more POs.

A PO generally refers to a set of physical downlink control channel (PDCCH) monitoring occasions where a paging indication for a UE is sent. A PO may consist of multiple time slots. Each UE may be assigned to one PO for each paging cycle. Within each PF, UEs may be randomly assigned to a PO by hashing their UE_ID, for example, according to the following equation:

$$i\_s=\mathrm{floor}(\mathrm{UE\_ID}/N) \bmod Ns;$$

where i_s is the index of a PO within a PF and Ns is a number of POs within a PF. Paging messages for UEs sharing the same PO are typically multiplexed in a single physical downlink shared channel (PDSCH).

Overview of Low-Power Wake Up Radio

In some cases, a user equipment (UE) may be equipped with an auxiliary receiver referred to as a low power wake-up receiver (LP-WUR) (e.g., a low power wake up radio). An LP-WUR is typically implemented using a relatively simple radio receiver circuit (e.g., non-coherent envelope detector) designed to detect low power wakeup signals (LP-WUS) with fairly low energy consumption.

Figure 7A:
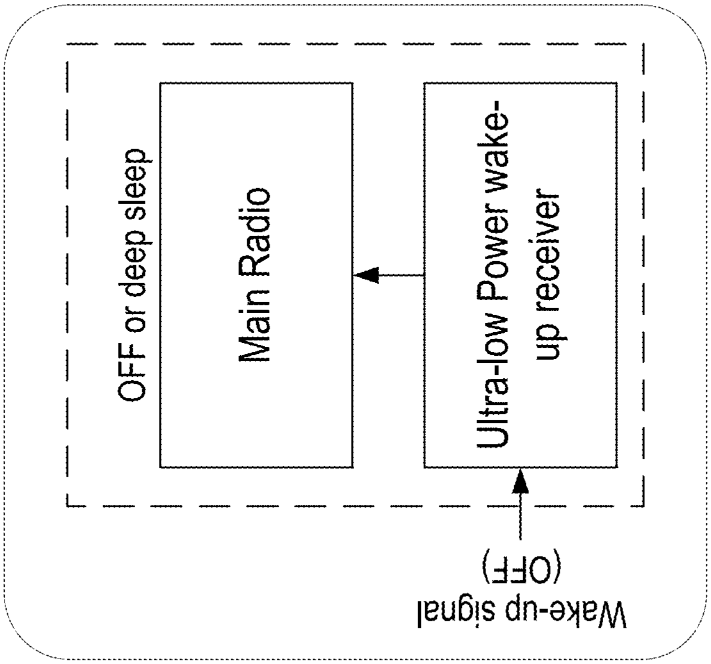
FIG. 7A and FIG. 7B depict different states of a UE equipped with a main radio and a low power wake up receiver (LP-WUR).
Figure 7B:
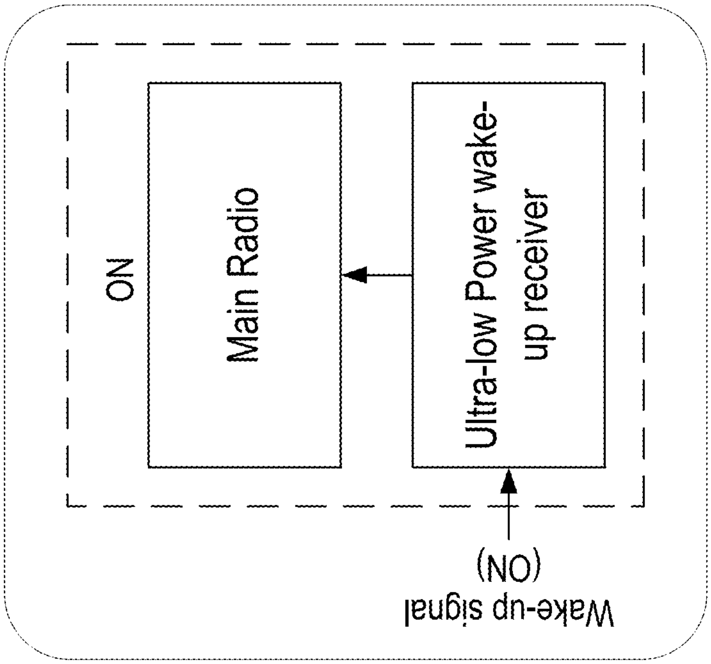

FIGS. 7A and 7B illustrates how a UE may utilize an LP-WUR to power up a main radio. When there is no data to receive, a main radio, which is coupled to an LP-WUR receiver, is set to OFF as illustrated in FIG. 7A. While in sleep mode, the LP-WUR keeps actively for monitoring low-power wakeup signal. In some cases, the LP-WUR may be operated on "always on" mode or a duty-cycle mode configured to further reduce UE power consumption. When there is data to receive, the LP-WUR receives an on-demand low power wake up signal (LP-WUS) and activates the main radio to be ON as illustrated in FIG. 7B. After activation, data is transmitted and received by the main radio.

By utilizing an LP-WUR, a UE may be able to conserve power with minimal impact on latency in reaching the UE via paging. A UE may enable frequent WUS monitoring to meet latency requirements. This is because a WUR typically requires significantly lower energy consumption than other conventional duty-cycling schemes where a main radio is periodically powered on for paging monitoring.

Utilization of an LP-WUS may reduce unnecessary UE paging reception. In these cases, an LP-WUS may be transmitted only if there is paging for idle or inactive mode UEs. As illustrated in a diagram 800 of FIG. 8, if an LP-WUS is detected by an LP-WUR during a WUS monitoring window, the main radio is then turned ON, and the main radio may begin monitoring synchronization signal block (SSB) to obtain timing synchronization before a paging occasion (PO). The radio may then receive paging accordingly. If an LP-WUS is not detected, the main radio stays in deep sleep mode for power saving.

Figure 8:
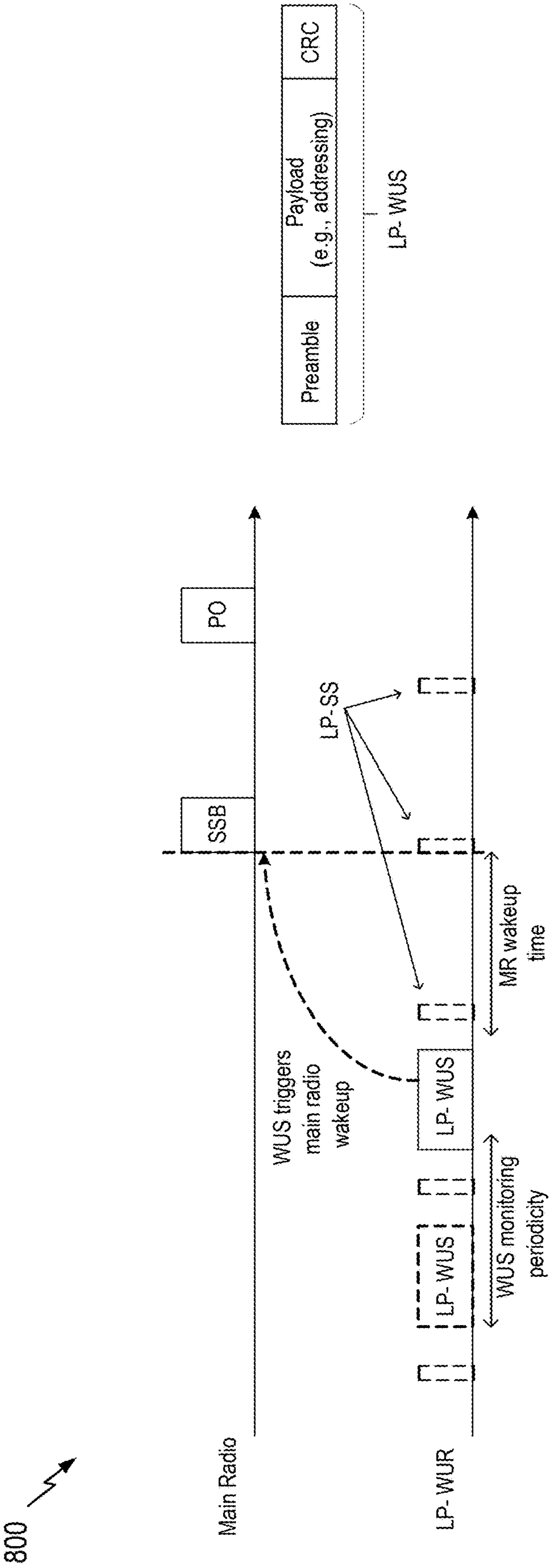
FIG. 8 depicts an example timeline and payload for a low power wake up signaling (LP-WUS).

FIG. 8 also illustrates an example LP-WUS. In some cases, the LP-WUS may carry more than a 1-bit payload (e.g., addressing information). Additionally, the LP-WUS contains a WUR preamble before payload and may be used for WUS detection, automatic gain control (AGC), and symbol timing recovery. Cyclic redundancy check (CRC) bits may be also appended for payload protection. In some cases, the LP-WUS can be sequence based, and a set of sequences with a maximized minimum distance are predefined each corresponding to one of the addressing information.

Aspects Related to Enhanced UE to Network (U2N) Relay Operation with LP-WUS Support In wireless systems, a radio resource control (RRC) protocol may be used for various functions. For example, the functions of the RRC protocol may include connection establishment and release functions, broadcast of system information, radio bearer establishment, reconfiguration and release, RRC connection mobility procedures, paging notification and release and/or outer loop power control. The operation of the RRC may be guided by a state machine, which defines certain specific states (or modes) that a device such as a UE may be present in. The different RRC states may include an RRC connected state, an RRC inactive state, and/or an RRC idle state. Usually, when the UE is powered up, the UE may be in an RRC disconnected/idle state and may then move to the RRC connected state. If there is no activity from the UE for some time, the UE may suspend its RRC session by moving to the RRC inactive state and may later resume its RRC session by moving back to the RRC connected state.

In wireless systems, paging may be used for system information (SI) updates and/or network-initiated connection setup when a UE may be in an RRC idle state or an RRC inactive state. The UE may sleep for most of the time to reduce battery consumption and may briefly wake-up to monitor some downlink transmissions. For example, the UE may periodically wake-up according to a predefined cycle to monitor a paging message from a gNodeB (gNB). The paging message may be carried in a downlink data channel transmission such as a physical downlink shared channel (PDSCH). Prior to the gNB sending the PDSCH to the UE, downlink control information (DCI) containing scheduling information of the PDSCH is sent to the UE. For example, the gNB may send a downlink control channel transmission such as a physical downlink control channel (PDCCH), which may carry the DCI to the UE.

In a normal operation, a UE must be awake all the time in order to decode downlink data, as data in a downlink may arrive at any time. This means that the UE must be monitoring a PDCCH in every subframe in order to check if there is the PDCCH available. This consumes a lot of battery power of the UE. A connected-mode discontinuous reception (CDRX) mode may enable the UE to turn off one or more components, such as a receiver, during certain periods because the UE is not anticipating receiving any downlink communications. For example, the CDRX mode may improve battery power consumption of the UE by allowing the UE to periodically enter a sleep state (e.g., Off duration) during which the PDCCH need not be monitored. In order to monitor the PDCCH for possible downlink/uplink data, the UE is allowed to wake up periodically and stay awake (e.g., On duration) for a certain amount of time before going to the sleep again.

A UE to network (e.g., gNB) relay node may be used to extend or improve the coverage of a gNB. For instance, the relay node may use PC5 connectivity over sidelink to extend Uu coverage. The sidelink PC5 may have already been configured to provide a reliable service in out-of-coverage scenarios for some UEs (e.g., remote UEs that are not directly connected to the gNB). For example, a UE may connect to the gNB via the relay node. A connection between the UE and the relay node may be over sidelink (e.g., PC5). The relay node may establish a Uu connection to the gNB. Relaying may be performed in a layer 2 (i.e., at a radio link control (RLC) layer).

The relay node may maintain identifications (IDs) of the UEs for which the relay node may perform a relaying operation. The relay node on receiving a paging message or signal (e.g., the WUS) from the gNB over Uu may determine if an ID (e.g., of any UE) within the paging message matches with any IDs of the UEs in its record. If the relay node may find a match of the ID of a specific UE in the paging message, the relay node may send a message (e.g., a UuMessageTransferSidelink) to the UE being paged.

When the relay node and the UEs (e.g., connected to the gNB via the relay node) may be in an RRC idle or inactive state, the relay node may monitor paging occasions (POs) of its PC5-RRC connected UEs. When the relay node may be in an RRC connected state and the UEs may in the RRC idle or inactive state, the relay node may monitor POs for the UEs or be paged with a dedicated RRC message.

A low power wake up signal (LP-WUS) is a feature of the UE for power savings of the UE. The LP-WUS may enable the UE to go into an ultra-deep sleep state and monitor LP-WUS occasions using a LP-wakeup radio. Only when the UE may receive the LP-WUS that is intended for the UE, the UE may transition from the ultra-deep sleep state to a DRX mode and may monitor its POs.

The UEs may or may not support use of the LP-WUS to exit from the ultra-deep sleep state. In UE to network relay scenario, the relay node may support receiving the LP-WUS to exit from the ultra-deep sleep state while the UEs may not support receiving the LP-WUS to exit from the ultra-deep sleep state and vice-versa. In such cases, the gNB and the relay node may need to be aware of the relay node and the UEs relationship in order to enhance a paging procedure to incorporate different capabilities of the UEs (i.e., whether the UEs may support receiving the LP-WUS to exit from their ultra-deep sleep state).

Aspects of the present disclosure relate to wireless communications, and more particularly, to techniques for managing paging of a relay node and its associated UEs. For example, techniques proposed herein may allow the relay node to share with a gNB a list of UEs connected to the gNB via the relay node and that the relay node expects to be woken up by a WUS from the gNB. The relay node may receive an indication from the gNB indicating the gNB support for using the WUS for a joint paging of the relay node and its associated UEs.

Particular aspects of the subject matter described in this disclosure can be implemented to realize one or more of the following potential advantages. For instance, the techniques for managing the joint paging of the relay node and its associated UEs may optimize power savings of the relay node and its associated UEs. The techniques proposed herein for managing the joint paging of the relay node and its associated UEs may be further understood with reference to FIG. 9-FIG. 11.

Figure 9:
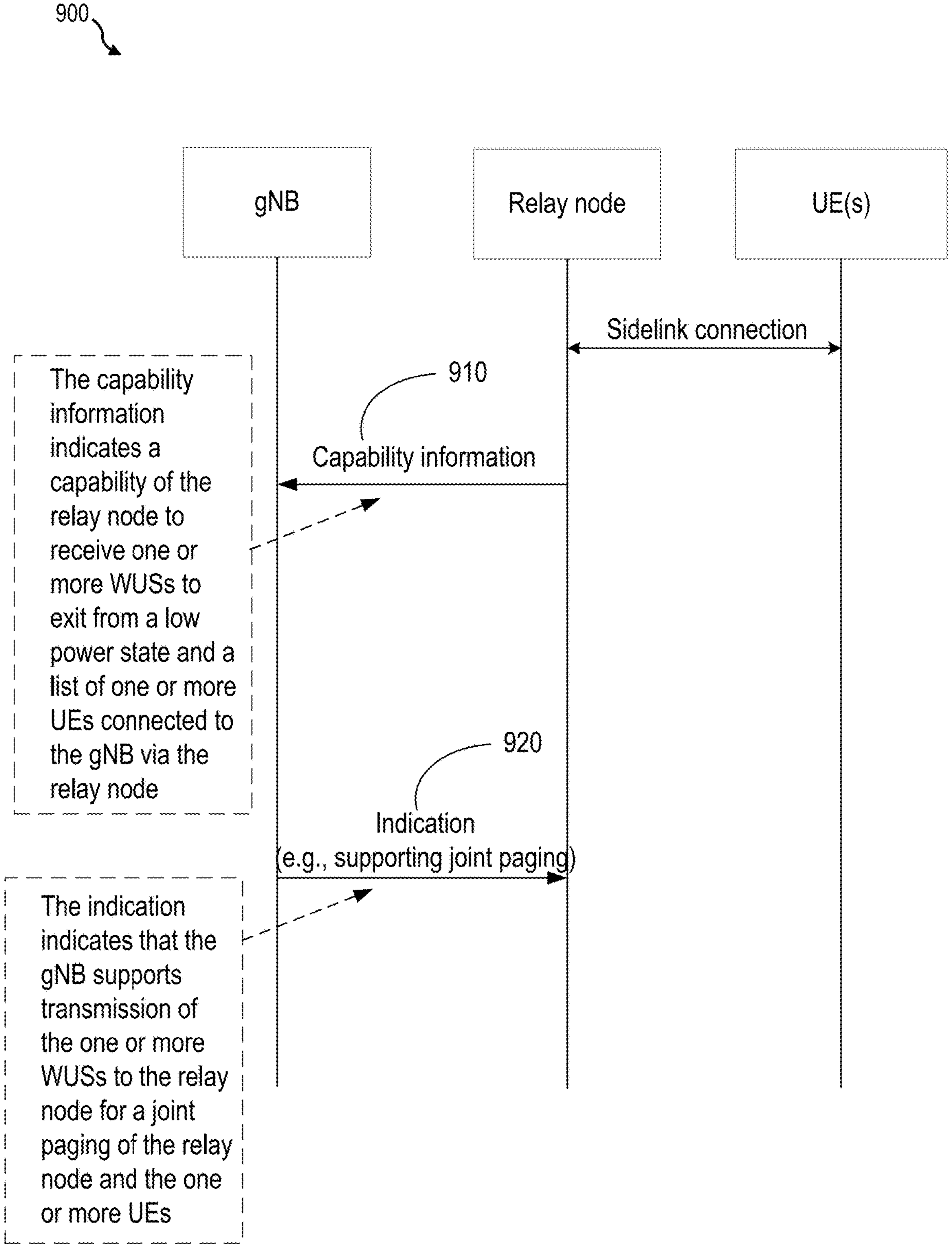
FIG. 9 depicts example call flow diagram illustrating communication among different devices for managing joint paging of a relay node and its associated UEs (e.g., remote UEs).

FIG. 9 depicts example call flow diagram 900 illustrating communication among different devices for managing a joint paging of a relay node and its associated UEs.

The gNB depicted in FIG. 9 may be an example of the BS 102 depicted and described with respect to FIG. 1 and FIG. 3, or the disaggregated BS depicted and described with respect to FIG. 2.

The relay node depicted in FIG. 9 may be an example of the UE 104 depicted and described with respect to FIG. 1 and FIG. 3.

The UE(s) depicted in FIG. 9 may be an example of the UE 104 depicted and described with respect to FIG. 1 and FIG. 3. The UE(s) and the relay node may perform sidelink communications via sidelink channels.

As indicated at 910, the relay node transmits capability information of the relay node to the gNB.

In certain aspects, the capability information may indicate a capability of the relay node to receive one or more WUSs to exit from a low power state (e.g., an ultra-deep sleep state). For example, the relay node may indicate to the gNB that the relay node expects to be woken up by a LP WUS (e.g., based on its capability).

In certain aspects, the capability information may indicate a list of UEs connected to the gNB via the relay node. For example, the relay node may share with the gNB the list of UEs connected to the gNB through the relay node based on its PC5 connection over sidelink.

As indicated at 920, the gNB transmits an indication to the relay node that the gNB supports transmission of the one or more WUSs to the relay node for joint paging. For example, the relay node may receive a positive indication from the gNB indicating the gNB support of the WUSs to the relay node for the joint paging of the relay node and its associated UEs. A negative indication from the gNB may prevent the relay node from going into the ultra-deep sleep state (e.g., and may use a DRX instead).

In certain aspects, the relay node may move to the low power state from a connected state. For example, the relay node (e.g., which may be connected to the UEs) may go into the ultra-deep sleep state after certain time intervals.

In certain aspects, the relay node may receive the one or more WUSs from the gNB to exit from the low power state (e.g., when the relay node may be into the low power state).

In certain aspects, the one or more WUSs may indicate an ID of the relay node. In other aspects, the relay node may receive the ID of the relay node from the gNB via some other signals.

In certain aspects, the one or more WUSs may indicate a group ID (or a common ID) for the list of UEs connected to the gNB via the relay node. In other aspects, the relay node may receive the group ID for the list of UEs from the gNB via some other signals.

In one aspect, the group ID for the list of UEs may be same as the ID of the relay node. In another aspect, the group ID for the list of UEs may be a unique ID that may be different from the ID of the relay node.

In certain aspects, the relay node may determine that the one or more WUSs received by the relay node may indicate the ID of the relay node. The relay node may then monitor for one or more paging messages carrying paging information during one or more paging occasions (POs) configured for the relay node (e.g., in response to determining that the one or more WUSs indicate the ID of the relay node).

In certain aspects, the relay node may determine that the one or more WUSs may indicate the group ID for the UEs. The relay node may then monitor for one or more paging messages carrying paging information during one or more POs configured for the one or more UEs (e.g., in response to determining that the one or more WUSs indicate the group ID for the UEs). The relay node may forward the paging information obtained by the relay node to one or more UEs.

For example, when the gNB may need to page the relay node and/or any of the UEs, the gNB may indicate the group ID through a WUS. The WUS may carry only a few bits as ID or be generated based on a limited set of sequences. Using the group ID for the UEs connected over the relay node may minimize the ID/sequence collision probability and may lower a number of UEs waking up unnecessarily in a cell. The relay node on receiving the WUS from the gNB may determine whether the WUS indicates the group ID (or its own ID). When the WUS indicates the group ID (or a relay node ID), the relay node may monitor a subsequent PO. The relay node may then forward any paging information to the one or more UEs and may resume a radio resource control (RRC) connection with the gNB.

In certain aspects, the relay node may receive an indication from the gNB that the gNB does not support sending the one or more WUSs to the relay node. The relay node may then periodically monitor for one or more paging messages carrying paging information during one or more POs configured for the relay node regardless of an absence of the one or more WUSs.

In certain aspects, the relay node may receive capability information of the UEs from the UEs indicating their capability to receive the one or more WUSs to exit from the low power state. The relay node may forward the capability information of the UEs to the gNB.

In certain aspects, a UE from the list of UEs may indicate its WUS capability to the gNB over RRC signaling. If the UE is connected to the gNB via the relay node, then the gNB may determine to forgo a transmission of the WUS to the UE based on the relay node not supporting use of the WUS.

The gNB may maintain a mapping of the relay node to the list of UEs (i.e., mapping information of all UEs connected to the relay node). Based on the mapping information, an RRC state of the UEs (e.g., the low power state or the connected state) and/or the capability of the relay node, the gNB may determine that transmitting the WUS for paging any of the UEs is unnecessary and may transmit paging information via a paging message or via the RRC signaling to the relay node.

In certain aspects, the relay node may determine that at least one UE from the list of UEs may have terminated a sidelink connection with the relay node. The relay node may then update the list of UEs to remove information associated with the at least one UE that may have terminated the sidelink connection with the relay node. The relay node may transmit an indication of an updated list of UEs to the gNB.

In one example, the relay node may determine that the at least one UE from the list of UEs may have terminated the sidelink connection with the relay node based on the at least one UE establishing a direct connection with the gNB. In another example the relay node may determine that the at least one UE from the list of UEs may have terminated the sidelink connection with the relay node based on the at least one UE establishing the sidelink connection with another relay node.

For example, when a first UE (e.g., from the list of UEs) may establish a direct link to the gNB or switch to another relay node, the relay node may update the list of UEs it is connected to (e.g., by removing the first UE from the list) and then notify the gNB of a change in a UE table (e.g., which may include the list of UEs the relay node is connected to). If the relay node may be in an RRC idle mode, the relay node may wake up and reestablish an RRC connection with the gNB and then send information associated with the updated list of UEs (e.g., via an updated UE table) to the gNB. The gNB on receiving the updated UE table from the relay node may determine if the first UE that has been removed is directly connected to the gNB (e.g., based on UE tables from other relay nodes). If a direct link establishment is determined for the first UE, the gNB may resume its transmission of a WUS for the first UE if the WUS is supported by the first UE and the gNB. The gNB may also update group information of UEs associated with the group ID (e.g., of a WUS for the relay node supporting WUS).

Example Methods for Wireless Communications

FIG. 10 shows an example of a method 1000 for wireless communications at a relay node. For example, the relay node may be a relay user equipment (UE), such as the UE 104 of FIG. 1 and FIG. 3.

Method 1000 begins at 1010 with transmitting, to a network entity, capability information of the relay node indicating a capability to receive one or more wakeup signals (WUSs) to exit from a low power state and a list of one or more UEs connected to the network entity via the relay node. In some cases, the operations of this step refer to, or may be performed by, circuitry for transmitting and/or code for transmitting as described with reference to FIG. 11.

Method 1000 then proceeds to 1020 with receiving an indication that the network entity supports transmission of the one or more WUSs to the relay node for a joint paging of the relay node and the one or more UEs. In some cases, the operations of this step refer to, or may be performed by, circuitry for receiving and/or code for receiving as described with reference to FIG. 11.

In certain aspects, the method 1000 further includes moving to the low power state from a connected state. In certain aspects, the method 1000 further includes receiving the one or more WUSs indicating at least one of: an ID of the relay node or a group identification (ID) for the one or more UEs to exit from the low power state.

In certain aspects, the group ID for the one or more UEs is same as the ID of the relay node.

In certain aspects, the group ID for one or more UEs is a unique ID that is different from the ID of the relay node.

In certain aspects, the method 1000 further includes determining that the one or more WUSs indicate the ID of the relay node. In certain aspects, the method 1000 further includes monitoring for one or more paging messages carrying paging information during one or more paging occasions (POs) configured for the relay node, in response to determining that the one or more WUSs indicate the ID of the relay node.

In certain aspects, the method 1000 further includes determining that the one or more WUSs indicate the group ID for the one or more Ues. In certain aspects, the method 1000 further includes monitoring for one or more paging messages carrying paging information during one or more paging occasions (POs) configured for the one or more UEs, in response to determining that the one or more WUSs indicate the group ID for the one or more Ues. In certain aspects, the method 1000 further includes forwarding the paging information obtained by the relay node to the one or more UEs.

In certain aspects, the method 1000 further includes receiving an indication that the network entity does not support sending the one or more WUSs to the relay node. In certain aspects, the method 1000 further includes periodically monitoring for one or more paging messages carrying paging information during one or more paging occasions (POs) configured for the relay node regardless of an absence of the one or more WUSs.

In certain aspects, the method 1000 further includes receiving capability information of the one or more UEs indicating the capability to receive the one or more WUSs at the one or more Ues. In certain aspects, the method 1000 further includes forwarding the capability information of the one or more UEs to the network entity.

In certain aspects, the method 1000 further includes determining that at least one UE of the one or more UEs has terminated a sidelink connection with the relay node. In certain aspects, the method 1000 further includes updating the list of the one or more UEs to remove information associated with the at least one UE that has terminated the sidelink connection with the relay node. In certain aspects, the method 1000 further includes transmitting an indication of an updated list of the one or more UEs to the network entity.

In certain aspects, the method 1000 further includes determining that the at least one UE of the one or more UEs has terminated the sidelink connection with the relay node based on the at least one UE of the one or more UEs establishing a direct connection with the network entity.

In certain aspects, the method 1000 further includes determining that the at least one UE of the one or more UEs has terminated the sidelink connection with the relay node based on the at least one UE of the one or more UEs establishing the sidelink connection with another relay node.

Figure 11:
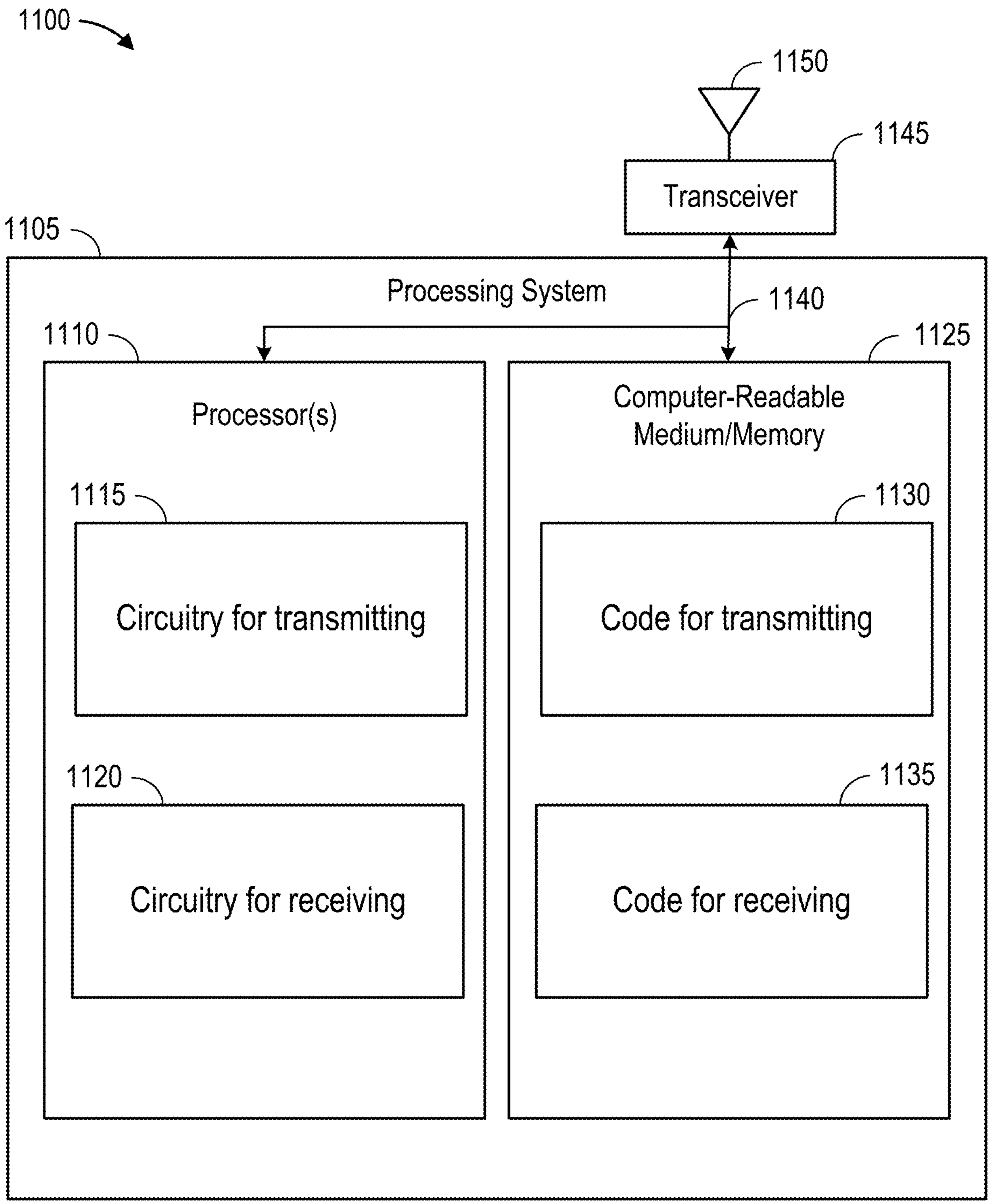
FIG. 11 depicts example communications device configured for managing joint paging of a relay node and its associated UEs.

In one aspect, the method 1000, or any aspect related to it, may be performed by an apparatus, such as a communications device 1100 of FIG. 11, which includes various components operable, configured, or adapted to perform the method 1000. The communications device 1100 is described below in further detail.

Note that FIG. 10 is just one example of a method, and other methods including fewer, additional, or alternative steps are possible consistent with this disclosure.

Example Communications Device

FIG. 11 depicts aspects of an example communications device 1100. In some aspects, the communications device 1100 may be a relay node, such as UE 104 described above with respect to FIG. 1 and FIG. 3.

The communications device 1100 includes a processing system 1105 coupled to a transceiver 1145 (e.g., a transmitter and/or a receiver). The transceiver 1145 is configured to transmit and receive signals for the communications device 1100 via an antenna 1150, such as the various signals as described herein. The processing system 1105 may be configured to perform processing functions for the communications device 1100, including processing signals received and/or to be transmitted by the communications device 1100.

The processing system 1105 includes one or more processors 1110. In various aspects, the one or more processors 1110 may be representative of one or more of receive processor 358, transmit processor 364, TX MIMO processor 366, and/or controller/processor 380, as described with respect to FIG. 3. The one or more processors 1110 are coupled to a computer-readable medium/memory 1125 via a bus 1140. In certain aspects, the computer-readable medium/memory 1125 is configured to store instructions (e.g., computer-executable code) that when executed by the one or more processors 1110, cause the one or more processors 1110 to perform the method 1000 described with respect to FIG. 10, and/or any aspect related to it. Note that reference to a processor performing a function of communications device 1100 may include the one or more processors 1110 performing that function of communications device 1100.

In the depicted example, the computer-readable medium/memory 1125 stores code (e.g., executable instructions), such as code for receiving (or obtaining) 1135 and/or code for transmitting (or outputting) 1130. Processing of the code for receiving 1135 and/or the code for transmitting 1130 may cause the communications device 1100 to perform the method 1000 described with respect to FIG. 10, and/or any aspect related to it.

The one or more processors 1110 include circuitry configured to implement (e.g., execute) the code stored in the computer-readable medium/memory 1125, including circuitry such as circuitry for receiving (or obtaining) 1120 and/or circuitry for transmitting (or outputting) 1115. Processing with the circuitry for receiving 1120 and/or the circuitry for transmitting 1115 may cause the communications device 1100 to perform the method 1000 described with respect to FIG. 10, and/or any aspect related to it.

Various components of the communications device 1100 may provide means for performing the method 1000 described with respect to FIG. 10, and/or any aspect related to it.

For example, means for transmitting, sending or outputting (e.g., for transmission) may include transceivers 354 and/or antenna(s) 352 of the UE 104 illustrated in FIG. 3 and/or the code for transmitting 1130, the circuitry for transmitting 1115, the transceiver 1145 and the antenna 1150 of the communications device 1100 in FIG. 11. Means for receiving or obtaining may include transceivers 354 and/or antenna(s) 352 of the UE 104 illustrated in FIG. 3 and/or the code for receiving 1135, the circuitry for receiving 1120, the transceiver 1145 and the antenna 1150 of the communications device 1100 in FIG. 11.

The means for performing the method 1000 described with respect to FIG. 10, and/or any aspect related to it may also include means for moving, means for determining, means for monitoring, means for forwarding, means for updating, etc. Means for moving may include processors, transceivers 354 and/or antenna(s) 352 of the UE 104 illustrated in FIG. 3 and/or a code for moving, a circuitry for moving, the transceiver 1145 and the antenna 1150 of the communications device 1100 in FIG. 11. Means for determining may include processors, transceivers 354 and/or antenna(s) 352 of the UE 104 illustrated in FIG. 3 and/or a code for determining, a circuitry for determining, the transceiver 1145 and the antenna 1150 of the communications device 1100 in FIG. 11. Means for monitoring may include processors, transceivers 354 and/or antenna(s) 352 of the UE 104 illustrated in FIG. 3 and/or a code for monitoring, a circuitry for monitoring, the transceiver 1145 and the antenna 1150 of the communications device 1100 in FIG. 11. Means for forwarding may include processors, transceivers 354 and/or antenna(s) 352 of the UE 104 illustrated in FIG. 3 and/or a code for forwarding, a circuitry for forwarding, the transceiver 1145 and the antenna 1150 of the communications device 1100 in FIG. 11. Means for updating may include processors, transceivers 354 and/or antenna(s) 352 of the UE 104 illustrated in FIG. 3 and/or a code for updating, a circuitry for updating, the transceiver 1145 and the antenna 1150 of the communications device 1100 in FIG. 11.

In some cases, rather than actually transmitting, for example, signals and/or data, a device may have an interface to output signals and/or data for transmission (a means for outputting). For example, a processor may output signals and/or data, via a bus interface, to a radio frequency (RF) front end for transmission. In various aspects, an RF front end may include various components, including transmit and receive processors, transmit and receive MIMO processors, modulators, demodulators, and the like, such as depicted in the examples in FIG. 3.

In some cases, rather than actually receiving signals and/or data, a device may have an interface to obtain the signals and/or data received from another device (a means for obtaining). For example, a processor may obtain (or receive) the signals and/or data, via a bus interface, from an RF front end for reception. In various aspects, an RF front end may include various components, including transmit and receive processors, transmit and receive MIMO processors, modulators, demodulators, and the like, such as depicted in the examples in FIG. 3. Notably, FIG. 11 is an example, and many other examples and configurations of communication device 1100 are possible.

Example Clauses

Implementation examples are described in the following numbered clauses:

Clause 1: A method for wireless communications at a relay node, comprising: transmitting, to a network entity, capability information of the relay node indicating a capability to receive one or more wakeup signals (WUSs) to exit from a low power state and a list of one or more user equipments (UEs) connected to the network entity via the relay node; and receiving an indication that the network entity supports transmission of the one or more WUSs to the relay node for a joint paging of the relay node and the one or more UEs.

Clause 2: The method of clause 1, further comprising: moving to the low power state from a connected state; and receiving the one or more WUSs indicating at least one of: an ID of the relay node or a group identification (ID) for the one or more UEs to exit from the low power state.

Clause 3: The method of clause 2, wherein the group ID for the one or more UEs is same as the ID of the relay node.

Clause 4: The method of clause 2, wherein the group ID for one or more UEs is a unique ID that is different from the ID of the relay node.

Clause 5: The method of clause 2, further comprising: determining that the one or more WUSs indicate the ID of the relay node; and monitoring for one or more paging messages carrying paging information during one or more paging occasions (POs) configured for the relay node, in response to determining that the one or more WUSs indicate the ID of the relay node.

Clause 6: The method of clause 2, further comprising: determining that the one or more WUSs indicate the group ID for the one or more UEs; monitoring for one or more paging messages carrying paging information during one or more paging occasions (POs) configured for the one or more UEs, in response to determining that the one or more WUSs indicate the group ID for the one or more UEs; and forwarding the paging information obtained by the relay node to the one or more UEs.

Clause 7: The method of any one of clauses 1-6, further comprising: receiving an indication that the network entity does not support sending the one or more WUSs to the relay node; and periodically monitoring for one or more paging messages carrying paging information during one or more paging occasions (POs) configured for the relay node regardless of an absence of the one or more WUSs.

Clause 8: The method of any one of clauses 1-7, further comprising: receiving capability information of the one or more UEs indicating the capability to receive the one or more WUSs at the one or more UEs; and forwarding the capability information of the one or more UEs to the network entity.

Clause 9: The method of any one of clauses 1-8, further comprising: determining that at least one UE of the one or more UEs has terminated a sidelink connection with the relay node; updating the list of the one or more UEs to remove information associated with the at least one UE that has terminated the sidelink connection with the relay node; and transmitting an indication of an updated list of the one or more UEs to the network entity.

Clause 10: The method of clause 9, wherein the determining comprises determining that the at least one UE of the one or more UEs has terminated the sidelink connection with the relay node based on the at least one UE of the one or more UEs establishing a direct connection with the network entity.

Clause 11: The method of clause 9, wherein the determining comprises determining that the at least one UE of the one or more UEs has terminated the sidelink connection with the relay node based on the at least one UE of the one or more UEs establishing the sidelink connection with another relay node.

Clause 12: An apparatus, comprising: at least one memory comprising instructions; and one or more processors configured, individually or in any combination, to execute the instructions and cause the apparatus to perform a method in accordance with any one of Clauses 1-11.

Clause 13: An apparatus, comprising means for performing a method in accordance with any one of Clauses 1-11.

Clause 14: A non-transitory computer-readable medium comprising executable instructions that, when executed by one or more processors of an apparatus, cause the apparatus to perform a method in accordance with any one of Clauses 1-11.

Clause 15: A computer program product embodied on a computer-readable storage medium comprising code for performing a method in accordance with any one of Clauses 1-11.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, “a processor,” “at least one processor” or “one or more processors” generally refers to a single processor configured to perform one or multiple operations or multiple processors configured to collectively perform one or more operations. In the case of multiple processors, performance the one or more operations could be divided amongst different processors, though one processor may perform multiple operations, and multiple processors could collectively perform a single operation. Similarly, “a memory,” “at least one memory” or “one or more memories” generally refers to a single memory configured to store data and/or instructions, multiple memories configured to collectively store data and/or instructions.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, the term wireless node may refer to, for example, a network entity or a UE. In this context, a network entity may be a base station (e.g., a gNB) or a module (e.g., a CU, DU, and/or RU) of a disaggregated base station.

While the present disclosure may describe certain operations as being performed by one type of wireless node, the same or similar operations may also be performed by another type of wireless node. For example, operations performed by a network entity may also (or instead) be performed by a UE. Similarly, operations performed by a UE may also (or instead) be performed by a network entity.

Further, while the present disclosure may describe certain types of communications between different types of wireless nodes (e.g., between a network entity and a UE), the same or similar types of communications may occur between same types of wireless nodes (e.g., between network entities or between UEs, in a peer-to-peer scenario). Further, communications may occur in reverse order than described.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

The invention claimed is:

1. An apparatus for wireless communications at a relay node, comprising:
- at least one memory comprising instructions; and
- one or more processors, individually or collectively, configured to execute the instructions and cause the apparatus to:
  - transmit, to a network entity, capability information of the relay node indicating a capability to receive one or more wakeup signals (WUSs) to exit from a low power state and a list of one or more user equipments (UEs) connected to the network entity via the relay node; and
  - receive an indication that the network entity supports transmission of the one or more WUSs to the relay node for a joint paging of the relay node and the one or more UEs.

2. The apparatus of claim 1, wherein the one or more processors, individually or collectively, are configured to execute the instructions and cause the apparatus to:
- move to the low power state from a connected state; and
- receive the one or more WUSs indicating at least one of: an ID of the relay node or a group identification (ID) for the one or more UEs to exit from the low power state.

3. The apparatus of claim 2, wherein the group ID for the one or more UEs is same as the ID of the relay node.

4. The apparatus of claim 2, wherein the group ID for one or more UEs is a unique ID that is different from the ID of the relay node.

5. The apparatus of claim 2, wherein the one or more processors, individually or collectively, are configured to execute the instructions and cause the apparatus to:
- determine that the one or more WUSs indicate the ID of the relay node; and
- monitor for one or more paging messages carrying paging information during one or more paging occasions (POs) configured for the relay node, in response to determining that the one or more WUSs indicate the ID of the relay node.

6. The apparatus of claim 2, wherein the one or more processors, individually or collectively, are configured to execute the instructions and cause the apparatus to:
- determine that the one or more WUSs indicate the group ID for the one or more UEs;
- monitor for one or more paging messages carrying paging information during one or more paging occasions (POs) configured for the one or more UEs, in response to determining that the one or more WUSs indicate the group ID for the one or more UEs; and
- forward the paging information obtained by the relay node to the one or more UEs.

7. The apparatus of claim 1, wherein the one or more processors, individually or collectively, are configured to execute the instructions and cause the apparatus to:
- receive an indication that the network entity does not support sending the one or more WUSs to the relay node; and
- periodically monitor for one or more paging messages carrying paging information during one or more paging occasions (POs) configured for the relay node regardless of an absence of the one or more WUSs.

8. The apparatus of claim 1, wherein the one or more processors, individually or collectively, are configured to execute the instructions and cause the apparatus to:
- receive capability information of the one or more UEs indicating the capability to receive the one or more WUSs at the one or more UEs; and
- forward the capability information of the one or more UEs to the network entity.

9. The apparatus of claim 1, wherein the one or more processors, individually or collectively, are configured to execute the instructions and cause the apparatus to:

determine that at least one UE of the one or more UEs has terminated a sidelink connection with the relay node;

update the list of the one or more UEs to remove information associated with the at least one UE that has terminated the sidelink connection with the relay node; and transmit an indication of an updated list of the one or more UEs to the network entity.

10. The apparatus of claim 9, wherein the determine comprises determine that the at least one UE of the one or more UEs has terminated the sidelink connection with the relay node based on the at least one UE of the one or more UEs establishing a direct connection with the network entity.

11. The apparatus of claim 9, wherein the determine comprises determine that the at least one UE of the one or more UEs has terminated the sidelink connection with the relay node based on the at least one UE of the one or more UEs establishing the sidelink connection with another relay node.

12. A method for wireless communications at a relay node, comprising:

transmitting, to a network entity, capability information of the relay node indicating a capability to receive one or more wakeup signals (WUSs) to exit from a low power state and a list of one or more user equipments (UEs) connected to the network entity via the relay node; and receiving an indication that the network entity supports transmission of the one or more WUSs to the relay node for a joint paging of the relay node and the one or more UEs.

13. The method of claim 12, further comprising:

moving to the low power state from a connected state; and receiving the one or more WUSs indicating at least one of: an ID of the relay node or a group identification (ID) for the one or more UEs to exit from the low power state.

14. The method of claim 13, wherein the group ID for the one or more UEs is same as the ID of the relay node.

15. The method of claim 13, wherein the group ID for one or more UEs is a unique ID that is different from the ID of the relay node.

16. The method of claim 13, further comprising:

determining that the one or more WUSs indicate the ID of the relay node; and monitoring for one or more paging messages carrying paging information during one or more paging occasions (POs) configured for the relay node, in response to determining that the one or more WUSs indicate the ID of the relay node.

17. The method of claim 13, further comprising:

determining that the one or more WUSs indicate the group ID for the one or more UEs;

monitoring for one or more paging messages carrying paging information during one or more paging occasions (POs) configured for the one or more UEs, in response to determining that the one or more WUSs indicate the group ID for the one or more UEs; and forwarding the paging information obtained by the relay node to the one or more UEs.

18. The method of claim 12, further comprising:

receiving an indication that the network entity does not support sending the one or more WUSs to the relay node; and periodically monitoring for one or more paging messages carrying paging information during one or more paging occasions (POs) configured for the relay node regardless of an absence of the one or more WUSs.

19. The method of claim 12, further comprising:

receiving capability information of the one or more UEs indicating the capability to receive the one or more WUSs at the one or more UEs; and forwarding the capability information of the one or more UEs to the network entity.

20. An apparatus for wireless communications at a network entity, comprising:

at least one memory comprising instructions; and one or more processors, individually or collectively, configured to execute the instructions and cause the apparatus to:

receive, from a relay node, capability information of the relay node indicating a capability to receive one or more wakeup signals (WUSs) to exit from a low power state and a list of one or more user equipments (UEs) connected to the network entity via the relay node; and transmit an indication to the relay node that the network entity supports transmission of the one or more WUSs to the relay node for a joint paging of the relay node and the one or more UEs.

* * * * *